United States Patent [19]
Collins et al.

[11] 3,909,598
[45] Sept. 30, 1975

[54] AUTOMATIC VOLATILITY COMPUTER

[75] Inventors: Michael John Collins, Charlotte; Bernard William Cruse, Jr., Indian Trail; Ronald James Goetchius, Charlotte, all of N.C.

[73] Assignee: CEM Corporation, Indian Trail, N.C.

[22] Filed: July 20, 1973

[21] Appl. No.: 381,087

[52] U.S. Cl. ........ 235/151.3; 235/151.33; 235/196; 131/22 R
[51] Int. Cl.² .......................................... G06G 7/16
[58] Field of Search ... 235/151.3, 184, 196, 151.33; 73/75, 77, 73; 23/274, 275, 276; 131/22 R, 135; 219/10.55

[56] References Cited
UNITED STATES PATENTS

| | | | |
|---|---|---|---|
| 2,915,898 | 12/1959 | Van Luik, Jr. | 235/196 X |
| 3,182,166 | 5/1965 | Bohm et al. | 219/10.55 |
| 3,493,738 | 2/1970 | Keller | 235/196 |
| 3,556,111 | 1/1971 | Wochnowski | 131/135 |
| 3,737,608 | 6/1973 | Nagao et al. | 219/10.55 |
| 3,777,258 | 12/1973 | Wochnowski | 131/135 X |

*Primary Examiner*—Edward J. Wise
*Attorney, Agent, or Firm*—Herbert M. Adrian, Jr.

[57] ABSTRACT

An automatic volatility computer is described as well as a method for automatically determining weight changes in substances containing volatile material. In particular, there is described an apparatus which automatically determines the percentage of volatiles in a substance which contains unknown quantities of polar volatiles such as water or moisture, solvents, plasticizers and the like. The apparatus provides rapid automatic analysis without operator assistance other than the placing of a sample on the automatic balance. In the preferred embodiment, a digital panel meter provides rapid readout coupled with the ability to recall the original weight and the weight obtained after removal of the volatiles.

13 Claims, 1 Drawing Figure

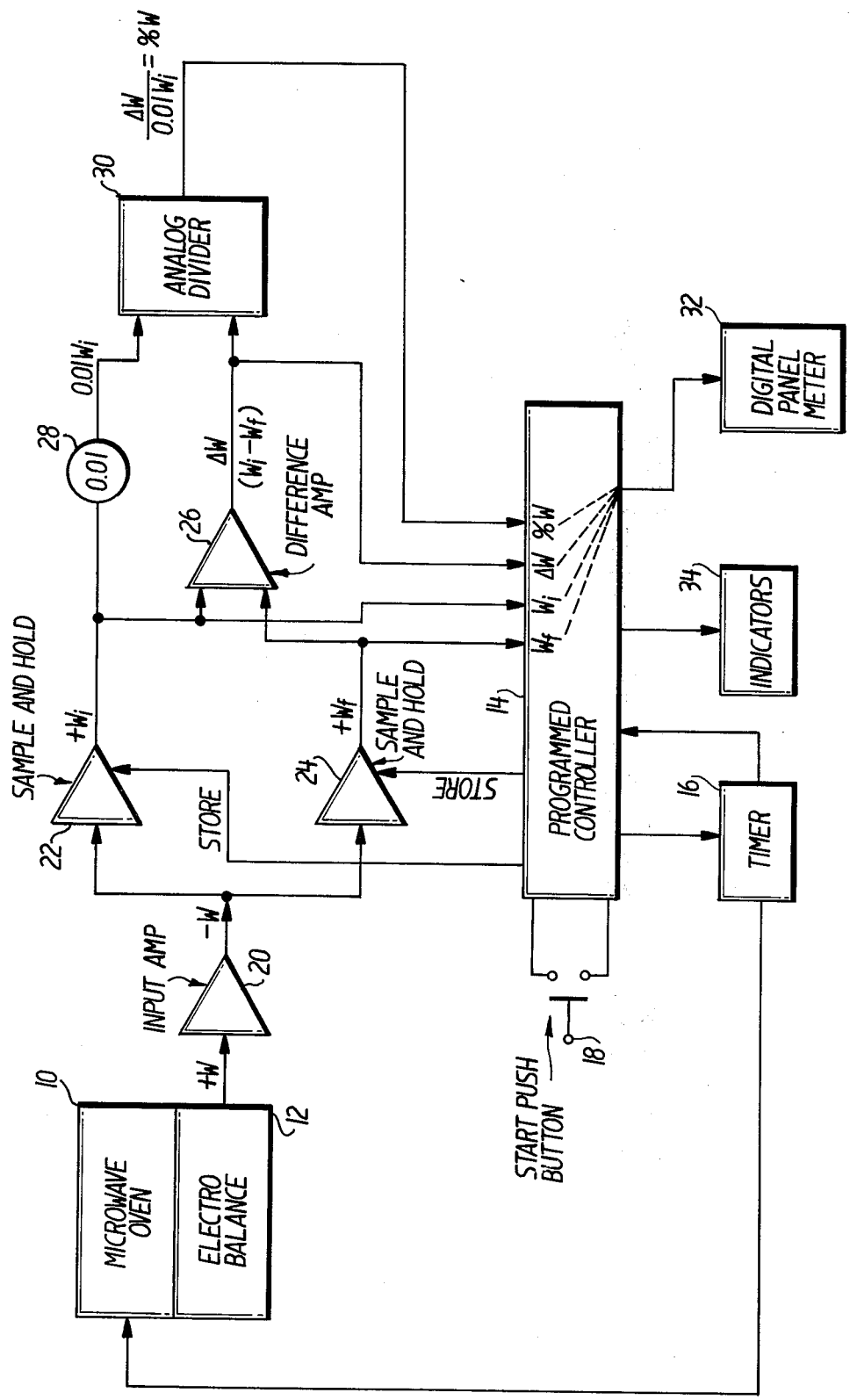

AUTOMATIC VOLATILITY COMPUTER

This invention relates to an apparatus and a method for automatically computing the amount of volatile matter in a substance containing a polar solvent. More particularly, the invention relates to an apparatus which automatically computes the percentage of volatiles in a given sample without operator assistance beyond the placing of the sample in the test apparatus.

BACKGROUND OF THE INVENTION

A very routine determination made countless times every day in numerous industries is the determination of the percentage of volatiles in a given substance. Such tests are run on literally thousands of items ranging from agricultural products such as tests which determine the percentage of moisture in corn, wheat, oats, tobacco and the like to textiles, foods, paints etc. Numerous industrial products are also tested to determine the percentage of volatiles, whether such volatiles be water, solvents or other diluents. These tests include the determination of the solids in paints, varnishes, lacquers, paper products and the like. Practically all items which are sold on a weight basis and are likely to absorb moisture require correction for such gain, such that a customer is not charged for water or other diluent. In the same manner, numerous items require a certain specified moisture or volatile level to be suitable for further use and are sold in the trade as being within specified rangess. Thus, considerable time is expended on quality control processes and testing to obtain the proper or desired percentage of moisture or solvent in the substance being sold.

Previously, tests for determining the percentage of volatiles was conducted by typical wet chemistry analysis. The sample to be tested would first be weighed by an operator and then placed on a hot plate or in a vacuum oven for a predetermined period of time, normally on the order of 30 minutes to 2 hours. The sample would then be cooled, reweighed and a calculation made to determine the percentage of the volatile removed from the sample.

Another method used is known as the Karl Fisher determination. This test involves a titration with a specified chemical reagent and a subsequent calculation of the amount of moisture present based on the titration.

Such methods are time consuming and require operator skill. The accuracy of the test is often directly related to the skill and care exercised by the operator. Further, while such tests are largely repetitious, an operator is substantially limited in the number of tests which can be performed in a given period. In many instances, such as in quality control work, the time required for a single test, i.e. as much as 2 hours or more, greatly inhibits plant operations such that processing conditions are normally two hours ahead of the test results. This requires advance interpretation of processing conditions and estimations as to when the product is within specifications.

It is an object of the present invention to provide an apparatus which automatically and quickly determines the amount of volatiles in a substance in a fraction of the time previously required.

It is a further object of the present invention to provide an apparatus which will prepare bone dry samples without destroying or damaging the same, which samples can be used in subsequent analytical determinations which require dried samples.

It is another object of the present invention to provide a method which eliminates the need for operator skill in determining the amount of volatiles in a substance, reduces or eliminates the chance of human error and reduces testing time to minutes or seconds per sample.

These and other objects will become apparent to those skilled in the art from the description of the invention which follows.

THE INVENTION

In accordance with the invention, an apparatus is provided for automatically computing the volatiles in a substance containing a polar solvent comprising automatic weighing means, microwave heating means, programmed controller means, memory circuit means, analog divider means and information readout means, said automatic weighing means being positioned within said microwave means, said controlling means being electrically connected to and programmed to sequentially actuate said weighing means, microwave heating means, memory circuit means, analog divider means and information readout means.

Additionally, the invention provides a method for automatically computing the amount of volatile polar matter in a substance containing the same, comprises programming and electrobalance positioned within a microwave oven to sequentially weigh the substance, actuate an electrical signal from said electrobalance to a memory circuit to record weight, subjecting the substance to microwave heating for a period of time sufficient to remove said volatiles, reactuating said electrobalance to reweigh and record in a memory circuit the second weight of said substance, electrically feeding the recorded weights to an analog divider, computing the change in weight in said analog divider and transcribing the output signal from said analog divider into readable form.

Various alternatives can be utilized with the present apparatus such as automatic recording means to print out the information obtained from said analog divider as a permanent record, digital panel meters to give a direct visible readout or other like transcribers well known in the art.

DETAILS OF THE INVENTION

The invention is more readily described by reference to the drawing which is a partial schematic and electrical diagram of a preferred embodiment of the present invention.

Referring more particularly to the drawing, the apparatus of the present invention utilizes an automatic balance, preferably an electrobalance, or other automatic balance which can be equipped to give an electrical signal proportional to the measured weight. The automatic balance is positioned within a microwave heating chamber such as is known in the art as a microwave oven. The preferred mode of positioning utilizes a top loading electrobalance which projects through the floor of the oven. The parts of the balance projecting into the microwave oven are preferably composed of materials which are transparent to the microwaves thereby eliminating heating of the balance during the conduction of the tests. Typically, a polypropylene, Teflon, polycarbonates, polyester and the like plastics are used for the stem and balance plate. For certain uses wherein additional heat is desired to aid in drying the sample, heat generating parts such as the balance plate or sample container can be used. Glass is particularly suitable because it normally has sufficient moisture trapped therein to generate heat when subjected to the noted radiation.

The microwave oven may be of conventional design having proper radiation shielding. It is, however, particularly desirable to make certain modifications to such conventional ovens to improve the heating efficiency for the present use. Firstly, it is desirable to utilize a radiation mixer to mix and disperse the radiation. Various radiation mixers are known in the art. Normally they are rotating metal fan-like machines which reflect the radiation. Such mixers avoid the production of hot spots which could decompose or destroy part of the sample being tested.

Additionally, it is particularly desirable to equip the oven with other radiation absorbing materials. Such other materials will couple with the radiation being emitted in the oven and thus prevent decomposition of the sample due to excessive radiation. Secondly, by having a radiation coupling material present, the life of the magnetron is increased. Thirdly, the coupling material prevents excessive leakage of radiation from the oven.

A preferred coupling material is water although any other polar substance could be used. It is preferred to circulate the coupling material through the oven in radiation transparent tubing. The amount of coupling material used can thus be readily regulated and adjusted to the desired volume.

A further useful modification of the oven is the utilization of an additional heat source. While the radiation energy alone is sufficient to quickly dry the sample, the application of circulating heated air promotes even faster drying. This modification can be readily accomplished by directing a stream of air across the magnetron, which normally requires cooling, and hence directing the thus heated air toward the sample positioned in the oven.

As is recognized in the art, microwave radiation is absorbed by water and polar organic molecules causing an increase in molecular motion. Due to the absorption of radiation energy, the water and polar solvents are selectively heated and removed through vaporization.

The operation of the apparatus is controlled by a programmed controller 14 which is programmed to automatically actuate the various components in the system in conjunction with timer 16. The apparatus is operated by first placing a sample of material to be tested on the electrobalance 12 in microwave oven 10. The program sequence is then initiated by an operator, such as by pushing start button 18.

The size of the sample can vary with the instrument size, electrobalance weight range and accuracy of test results desired. The electrobalance and microwave oven can be sized to the intended usage. However, it is understood that the basic usage of the present apparatus is for analytical purposes and, as such, analytical weight ranges and sizes are normally used. This is best sized such that the sample will give at least about a 100 milligram weight loss for the preferred electrobalance. It is of course readily apparent that more sensitive electrobalances can be used for smaller samples, but such are generally impractical except for specialized usages. Therefore, the preferred sample weight range is about 1 to 20 grams for most usages. Weights of up to 1000 grams or more can be used with the proper selection of the electrobalance.

Electrobalance 12 electrically signals the weight of the sample to input amplifier 20 and hence to sample and hold amplifier 22. Sample and hold amplifier 22 and 24 are analog memory devices or memory circuits. Input amplifier 20 provides a buffer between the electrobalance and storage circuits 22 and 24. Additionally, such input amplifier is used for noise filtering and signal polarity inversion.

Programmed controller 14 having caused the initial weight of the sample to be stored in memory circuit 22 then actuates the microwave oven magnetron 10 through timer 16. Timer 16 is preset to maintain microwave oven magnetron on for a period of time sufficient to drive off volatile material from the sample. The particular time required depends largely with the material being analyzed and the volatile material being removed. The most preferred time is readily determined empirically and can vary from as little as about five seconds to as long as about 10 minutes. Normal test times are in the range of about 1 to 5 minutes for most volatile materials. The particular time required is largely dependent on the radiation absorption coefficient of the particular volatile material. It should also be noted that when a polar material is present, other nonpolar volatiles will be removed due to the heating effect of the polar material.

The oven magnetron is preferably of standard manufacture having a power output of 500 to 800 watts and a frequency within the government approved ranges. The United States Federal Communication Commission has designated the frequencies of 915 and 2450 mega hertz as suitable for such magnetrons. Smaller magnetrons could be used with a corresponding limitation of versatility. Larger magnetrons could also be used but are generally unnecessary for normal analytical usage. In all instances, adequate radiation shielding is provided along with safety interlocking switches to eliminate the possibility of radiation leaking from the oven.

After completing the timed magnetron sequence, the timer shuts down the magnetron and signals the program controller 14 to continue. Program controller 14 senses electrobalance 12 output signal which is proportional to the final weight. Such final weight signal travels through input amplifier 20 to sample and hold memory circuit 24 for retention. Controller 14 then obtains the difference between initial weight stored in memory circuit 22 and final weight stored in memory circuit 24 by means of differential amplifier 26. A signal representative of the weight difference from differential amplifier 26 is fed to analog divider 30 along with the fractional initial weight signal times 0.01 obtained from fixed ratio circuit 28. It should be noted that fixed ratio circuit 28 can be eliminated if a readout of weight difference only is desired. However, in instances where it is desirable to claculate the percentage of volatiles directly, fixed ratio circuit 28 is desired.

Analog divider 30 emits an electrical signal proportional to the percentage of volatiles, that is the weight differential divided by fixed ratio circuit 28, which signal is stored by program controller for transcription and readout.

The information readout from program controller 14 can be in any of the known forms of computer readout. Such forms include printed copy, digital panel meter readings, direct feed to other computers or to controlling process mechanism and the like. A preferred mode of readout is the digital panel meter 32. Such meter used in conjunction with indicators 34 are particularly helpful in normal testing procedures. Indicators 34 designate by code, numerals, lights or the like signals the particular readout being shown on digital panel meter 32. Such readouts include the initial sample weight, final sample weight, the difference between initial and final weight and percent of volatiles in the sample. Such indicators are further useful when used in conjunction with program controller 14 so as to indicate on the digital meter the particular stage of analysis. Such indicators are also particularly desirable for use with memory recall, such as when it is desirable to recall one or more of the noted measurements. Such recall is useful where the operator may want to recheck initial weight and weight changes to check calculations. Push buttons or electrical switches can be provided so that the operator can reexamine these data on the digital panel meter.

Where printed readout is utilized, such recall is not necessary since the readout is on printed copy.

The repushing of start button 18 erases program controller memory units from the previous test and reinitiates a new testing sequence.

While the present apparatus has been described more particularly as an analytical instrument, it is recognized that it can be readily adapted to other uses such as in line production control, production usage and the preparation of dried samples for further testing or other uses.

What is claimed is:

1. An automatic volatility computer comprising automatic weighing means, microwave heating means, a program controller means, memory circuit means, differential amplifier means, analog divider means and information readout means, said automatic weighing means being positioned within said microwave heating means, said controlling means being electrically connected to and programmed to sequentially actuate said weighing means and mircowave heating means, said weighing means being electrially connected to said memory circuit means and hence to said differential amplifier means, said analog divider means being electrically connected to said differential amplifier means and said memory circuit means, the output thereof being electrically connected to said information readout means.

2. The apparatus of claim 1 wherein said microwave heating means is a magnetron radiation tube of 500 to 800 watts.

3. The apparatus of claim 1 wherein said information readout means is a digital panel meter.

4. The apparatus of claim 3 wherein said digital panel meter is equipped in conjunction with said program controller means and memory circuit means with memory recall means.

5. The apparatus of claim 1 wherein said information readout means is a printer for the production of printed copy of recorded and calculated results.

6. The apparatus of claim 1 wherein analog divider means is preset to calculate the weight differential as percentage weight loss.

7. The apparatus of claim 1 wherein the microwave heating means has radiation coupling means asssociated therewith.

8. The apparatus of claim 1 wherein the microwave heating means has radiation mixing means associated therewith.

9. The apparatus of claim 1 wherein heating means in addition to microwave means is provided.

10. A method for automatically computing the amount of volatile matter in a substance containing the same comprising programming an electrobalance positioned within a microwave oven to sequentially weigh the substance, actuate an electrical signal from said electrobalance to a memory circuit to record the weight, subjecting the substance to mircowave heating for a period of time sufficient to remove the volatiles, reactuate said electrobalance to reweigh and record in a memory circuit the weight of said substance, electrically feeding said recorded weights to a differential amplifier and hence to an analog divider, compute the change in weight in said analog divider and transcribe the output signal from said analog divider into readable form.

11. The method of claim 10 wherein the volatile matter computed as present in a substance is the polar solvent therein.

12. The method of claim 10 wherein the microwave heating is for a period of 5 seconds to 10 minutes.

13. The method of claim 10 wherein the weight of the substance containing volatiles is within the range of about 2 grams to 1000 grams.

* * * * *